March 17, 1925.
F. C. BOGART
CHAIN FASTENER
Filed April 29, 1924
1,530,152
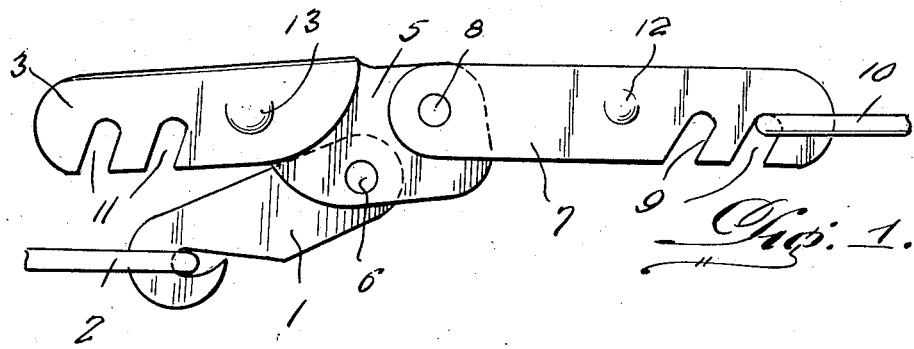
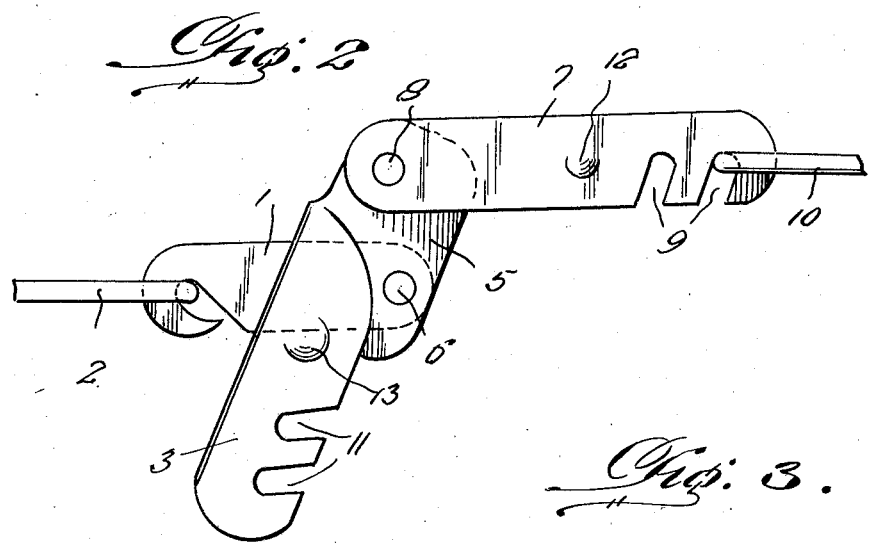
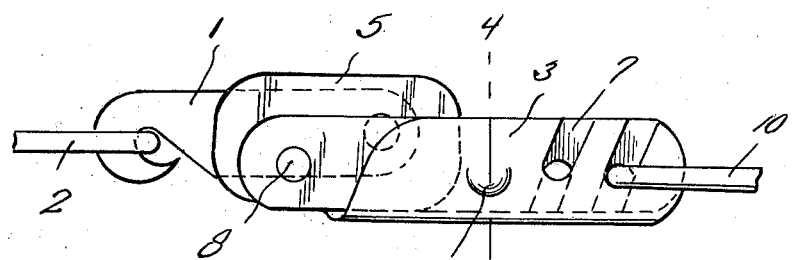
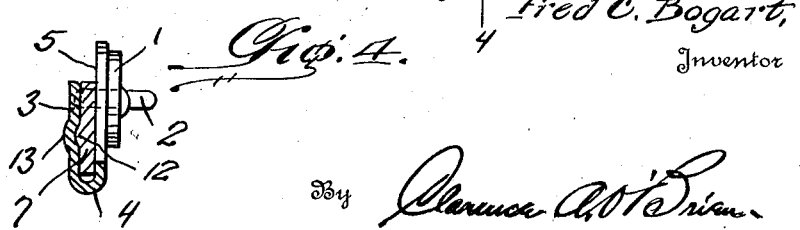
Fred C. Bogart, Inventor
By Clarence A. O'Brien, Attorney Patented Mar. 17, 1925.

1,530,152

UNITED STATES PATENT OFFICE.

FRED C. BOGART, OF GARLAND, PENNSYLVANIA.

CHAIN FASTENER.

Application filed April 29, 1924. Serial No. 709,838.

*To all whom it may concern:*

Be it known that I, FRED C. BOGART, a citizen of the United States, residing at Garland, in the county of Warren and State of Pennsylvania, have invented certain new and useful Improvements in a Chain Fastener, of which the following is a specification.

This invention relates to new and useful improvements in chain fasteners and principally adapted for use in connection with an anti-skid chain which extends circumferentially around the tire of a wheel.

One of the important objects of the present invention is to provide a chain fastener for securing the free ends of the circumferentially extending chain on a tire wherein means is provided for preventing the accidental opening of the fastener when the same is in a locked position.

A still further object of the invention is to provide a chain fastener of the above mentioned character, wherein the lever which is provided for drawing the free ends of the circumferentially extending chain or chains together is further adapted to provide a retaining means for one of the hook members whereby the end of the chain positioned therein will be prevented from accidentally becoming disengaged therefrom.

A still further object of the invention is to provide a chain fastener of the above mentioned character, which is simple in construction, inexpensive, strong and durable and furthermore adapted for the purposes for which it is designated.

A still further object is to provide a chain fastener of the above mentioned character, which is of such a construction as to enable the same to be readily and easily opened or closed as the case may be without requiring the use of any complicated tools.

Other objects and advantages of this invention will become apparent during the course of the following description.

In the accompanying drawing forming a part of this specification and in which like numerals designate like parts throughout the same:

Figure 1 is a side elevation of my invention showing the chain fastener in an open position.

Figure 2 is a similar view showing the chain fastener in a partly closed position.

Figure 3 is a similar view showing the chain fastener in a closed position, and

Figure 4 is a sectional view taken approximately on line 4—4 of Figure 3.

In the drawing wherein for the purpose of illustration is shown the preferred embodiment of my invention, the numeral 1 designates an attaching hook which is adapted to be secured to one of the free ends 2 of a tire chain which extends circumferentially around the tire in the manner well known in the art. The numeral 3 designates an elongated lever which is of plate-like formation and has one of the longitudinal edges thereof provided with an inwardly turned flange 4 in the manner clearly shown in Figure 4 of the drawing. The inner end of the flange 4 terminates in the enlarged ear 5 which is also of plate-like formation and is disposed in a plane parallel to the lever 3 in the manner clearly shown in Figure 4 of the drawing.

The enlarged ear 5 provides a means for pivotally supporting the lever 3 on the outer end of the attaching hook 1 and the pivotal means therefor is shown at 6 in the drawing. The attaching hook 1 is pivoted at 6 adjacent the forward lower end of the ear in the manner clearly shown in Figures 1 and 2 of the drawing. Pivotally supported on the upper opposite end of the ear 5 and on the opposite side on which the outer end of the attaching hook 1 is pivoted to the ear is the second hook 7. The pivotal means therefor is shown at 8. The second hook 7 extends outwardly in opposite direction to the attaching hook 1 and is normally disposed in a plane above the plane of the attaching hook, in the manner clearly illustrated in the drawing.

The outer end of the second hook 7 is provided with suitable notches such as is shown at 9 in its lower edge for the purpose of receiving the opposite free end 10 of the circumferentially extending tire chain.

The longitudinal edge of the lever 3 opposite the flange 4 has the notches 11 formed therein adjacent the outer forward end of the lever and the purpose of these notches is to provide a means for cooperation with the notches 9 provided in the outer end of the second hook 7 in the manner hereinafter to be more fully described.

The operation of my chain fastener may be briefly stated as follows: Normally the chain fastener is carried by one of the ends of the circumferentially extending chains, the attaching hook 1 and the link 2 serving this particular purpose. With the parts arranged as shown in Figure 1 of the drawing, the opposite free end 10 of the chain is disposed in one of the notches 9 of the second hook 7 and the lever 3 is then swung downwardly on its pivot 6 in the manner shown in Figure 2 of the drawing, simultaneously causing a forward movement of the second hook 7 and the end of the chain connected thereto as to cause the chain connected to the second hook to be brought toward the end of the chain fastened to the attaching hook 1. The lever 3 is further swung on its pivot 6 until the second hook 7 will fit between the flange 4 and the plate-like lever in the manner shown in Figure 4 of the drawing, whereby the lever will then act as a casing for the second hook and the notches 11 formed in the lever will cooperate with the oppositely arranged notches 9 formed in the second hooks 7 to hold the free end 10 of the chain in position on the outer free end of the second hook.

To prevent the accidental opening of the casing or lever after the same has been moved to the position as shown in Figures 3 and 4, I provide securing means which includes a projection 12 formed on the intermediate portion of the second hook 7 and which is adapted to extend into a suitable socket formed by the protuberance 13 provided in the intermediate portion of the lever 3. This fastening means is clearly illustrated in the drawing and as the same is well known in the art, a further description of the same is not thought necessary.

When the chain fastener is in the position as shown in Figure 3, the free ends of the circumferentially extending chain will be securely held in locked engagement and will be prevented from accidentally becoming unfastened. The provision of a chain fastener of this character will prevent any possibility of the free ends of the chain from being disengaged with respect to the fastener and furthermore there will be no possibility of the strain or pull exerted on the chain fastener to cause the unlocking of the same.

A chain fastener of the above mentioned character, may be manufactured at a very low cost and will further be strong and durable. The simplicity of my device furthermore enables the same to be actuated in a comparatively simple and efficient manner and will not require the use of any tools in order to operate the same.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. A chain fastener comprising an attaching hook, a lever having a flange formed on one of the longitudinal edges thereof, an ear formed on the inner end of said flange and extending outwardly from said lever in a plane parallel thereto, said attaching hook being pivotally connected to said ear, a second hook pivoted to said ear and extending outwardly in opposite directions to the attaching hook, said lever and the flange formed thereon providing a retaining means for the second hook when the lever is in engagement with the second hook.

2. A chain fastener comprising an attaching hook, a lever having a flange formed on one of the longitudinal edges thereof, an ear formed on the inner end of said flange and extending outwardly from said lever in a plane parallel thereto, said attaching hook being pivotally connected to said ear, a second hook pivoted to said ear and extending outwardly in opposite directions to the attaching hook, said lever and the flange formed thereon providing a retaining means for the second hook when the lever is in engagement with the second hook, and locking means arranged on the adjacent faces of the second hook and the lever.

3. A chain fastener comprising an attaching hook, a lever of plate-like formation having a flange formed on one of the longitudinal edges thereof, an enlarged ear formed on the inner end of said flange and extending outwardly from said lever in a plane parallel thereto, said attaching hook being pivotally connected at its outer end to the lower inner end of said ear, a second hook pivotally supported to the upper outer end of said ear on the opposite side of the ear and extending in a direction opposite to the attaching hook, said lever and the flange formed thereon adapted to provide a retaining means for the second hook when the same is in a closed position, said flange having a depression formed therein, and a projection on the second hook adapted to fit in said depression to prevent the accidental opening of the chain fastener.

In testimony whereof I affix my signature.

FRED C. BOGART.